United States Patent [19]

Lamers et al.

[11] Patent Number: 4,659,609

[45] Date of Patent: Apr. 21, 1987

[54] ABRASIVE WEB AND METHOD OF MAKING SAME

[75] Inventors: Gregory C. Lamers; Dan D. Endres, both of Appleton; Maung H. Win, Neenah; Cary K. Kuenn, Appleton, all of Wis.

[73] Assignee: Kimberly-Clark Corporation, Neenah, Wis.

[21] Appl. No.: 859,172

[22] Filed: May 2, 1986

[51] Int. Cl.$^4$ .............................................. B32B 3/00
[52] U.S. Cl. ................................ 428/194; 15/104.93; 15/209 R; 15/209 C; 156/302; 156/303; 428/215; 428/286; 428/296
[58] Field of Search ................ 428/76, 194, 215, 286, 428/296; 15/209 R, 104.93, 209 C; 156/302, 303

[56] References Cited

U.S. PATENT DOCUMENTS

| | | | |
|---|---|---|---|
| 3,978,185 | 8/1976 | Buntin et al. | 264/121 |
| 4,041,203 | 8/1977 | Brock et al. | 428/157 |
| 4,298,649 | 11/1981 | Meitner | 428/212 |
| 4,519,798 | 5/1985 | Dinius | 128/156 |

*Primary Examiner*—James C. Cannon
*Attorney, Agent, or Firm*—Gregory E. Croft; Donald L. Traut; Jeremiah J. Duggan

[57] ABSTRACT

An abrasive polypropylene meltblown web having a very light basis weight and thick fibers is made by depositing the fibers onto a substrate while in a semi-molten state.

9 Claims, 5 Drawing Figures

ABRASIVE WEB AND METHOD OF MAKING SAME

BACKGROUND OF THE INVENTION

Nonwoven thermoplastic webs are well known for a wide variety of end-uses, such as for wipes, surgical gowns, dressings, etc. These products are generally made by either meltblowing or spunbonding, both of which are well known in the art. See, for example U.S. Pat. No. 3,978,185 to Bunting et al. dated Aug. 31, 1976, which describes meltblowing and is herein incorporated by reference. Also see U.S. Pat. No. 3,692,618 to Dorschner et al. dated Sept. 19, 1972, which describes spunbonding and is herein incorporated by reference.

Spunbonding entails extruding a multiplicity of continuous thermoplastic polymer strands through a multiplicity of die orifices in a downward direction onto a moving surface where the extruded strands are collected in randomly distributed fashion. The randomly deposited strands are then bonded together in a heated nip to provide sufficient integrity to the resulting nonwoven web of continuous fibers. Spunbonded webs are characterized by a high strength/weight ratio, isotropic strength, high porosity, and good abrasion resistance and are useful for a wide variety of product applications ranging from diaper liners to street repair fabrics.

Meltblowing differs from spunbonding in that the extruded polymer strands are broken up and dispersed into individual fibers by a forced air stream before being deposited onto the collecting surface. In addition, the fibers are substantially cooled by the air so that they do not significantly bond together. Bonding of the web to retain integrity and strength occurs as a separate downstream operation. Meltblown webs are characterized by their softness, bulk, absorbency, low porosity and poor abrasion resistance and are useful for product applications such as surgical drapes and wipes.

Notwithstanding the fact that much nonwoven product development is directed toward products which provide enhanced softness and greater flexibility, there is also a need for an inexpensive nonwoven product which is sufficiently abrasive to serve as a cleaning wipe without using added abrasive materials, yet soft enough to reduce or eliminate scratching the surface being cleaned.

SUMMARY OF THE INVENTION

In one aspect, the invention resides in a method for making an abrasive web comprising meltblowing a polymer melt onto a supporting web such that the meltblown fibers are at a temperature at or above the polymer softening point and remain sufficiently semi-molten (hot and fusible) to thermally bond to the supporting web. By making a web in this manner, the resulting meltblown fibers, which are thicker than conventional meltblown fibers, intimately bond to the supporting web and harden into an abrasive surface. The resulting layered web thus exhibits the strength of the supporting web, which is preferably a spunbonded web, and the abrasiveness of the meltblown layer.

To achieve the desired product characteristics, a number of variables must be considered when practicing the method of this invention. These variables include the characteristics of the polymer, the temperature of the melt, the design of the meltblowing die tip, the denier of the extruded melt and resulting fibers, the melt flow rate, the meltblowing air temperature and flow rate, the distance between the die tip and the supporting web, the basis weight of the meltblown layer, and the nature of the supporting web. However, upon reading this specification those skilled in the art of manufacturing nonwoven webs will readily be able to manipulate these variables as necessary to achieve semi-molten meltblown fibers capable of bonding to the supporting web. In fact, in current commercial operations for making typical meltblown materials, such semi-molten fibers are occasionally made inadvertently and the resulting product is discarded as waste material.

In a further aspect, the invention resides in a layered abrasive web comprising a supporting layer and a meltblown abrasive layer intimately thermally bonded together, said meltblown abrasive layer having a basis weight of from about 5 to about 25 grams per square meter (gsm) and essentially consisting of fibers having an average fiber diameter of at least about 40 micrometers, preferably from about 40 to about 85 micrometers, and most preferably about 50 micrometers. Such a web provides an abrasive wipe at very low materials costs. The meltblown layer is very thin, having a basis weight substantially lower than typical meltblown webs. The supporting layer, which is preferably a spunbonded web because of its high strength-to-weight ratio, provides the necessary product strength and integrity and, in some instances, absorbency.

In further aspects, the invention resides in various different product forms which utilize the layered abrasive web concept described above. One such embodiment is a single-ply two-layered abrasive meltblown/spunbonded wipe, which can be impregnated with a wide variety of chemical additives, for cleaning household surfaces or for bathing. Another example of a product form of this invention is a single-ply three-layered abrasive wipe (meltblown/spun-bonded/meltblown) in which both outer surfaces are abrasive meltblown layers. A further example is a three-ply wiping product wherein a first outer ply comprises an abrasive meltblown/spunbonded layered web having the abrasive meltblown layer facing outwardly, an inner ply comprises a water-permeable nonwoven thermoplastic web, and a second outer ply comprises a water-permeable meltblown thermoplastic web. Each of the plies is bonded together along the periphery of the wipe and a detergent is contained between the inner ply and the second outer ply. A still further example of a product form of this invention is a shower cloth comprising a two-layered meltblown/spunbonded web, constructed of two separate plies or one ply folded over on itself, such that the abrasive meltblown layer is the exposed layer on both outer surfaces.

These and other aspects of this invention will be described in greater detail with reference to the Drawing.

DETAILED DESCRIPTION OF THE DRAWING

Figure 1:
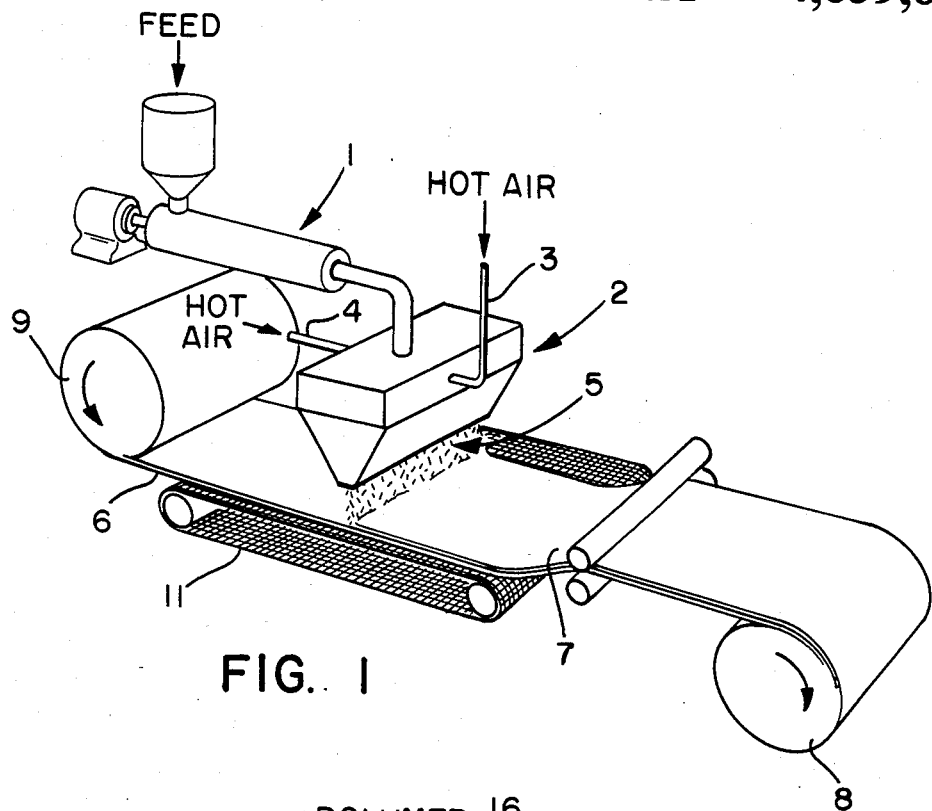
FIG. 1 is a schematic flow diagram illustrating the method of this invention.

Referring to FIG. 1, the method of this invention will be described in greater detail. FIG. 1 illustrates the method of this invention wherein a layer of meltblown fibers is deposited upon a supporting web to form a layered abrasive composite web. More specifically, polymer feed pellets are introduced into an extruder 1 in which the polymer is melted and conveyed to the melt blowing head 2. The melt blowing head essentially comprises two forced hot air inlets 3 and 4 and a multiplicity of extrusion orifices through which the polymer melt is extruded. In a preferred embodiment, the blowing head contains about 30 orifices per inch having a diameter of about 0.0145 inch. As the polymer melt is extruded downwardly, the interaction of the extrudate with the forced hot air disrupts the extrudate to form discontinuous, semi-molten fiber fragments 5 which immediately begin to solidify. However, prior to solidification, while still in a bondable condition, the fibers are deposited onto a supporting web 6 and intimately thermally bond thereto as solidification is completed. The resulting layered web 7 is then calendered and wound onto a roll 8 for subsequent conversion into a particular product form. As shown in FIG. 1, the supporting web 6 of the product can be provided from a roll 9 which is simply unwound at the desired rate, or it can also be provided by forming it in line on the support fabric 11 prior to deposition of the meltblown fibers.

Suitable polymer feed materials for producing the meltblown abrasive layer of the layered web of this invention include, without limitation, polypropylene, polyethylene, nylon, polyethers, ethylene vinyl acetate, polyvinyl chloride, polyesters, and copolymers thereof. However, polypropylene having a weight average molecular weight greater than about 200,000 is preferred because of its availability, ease of spinning, and abrasive properties. Suitable commercially available materials include Exxon 3045 and Hercules PRO-FAX polypropylene pellets.

Suitable supporting web materials for the supporting layer of the layered web of this invention include spunbonded webs of various polymers as listed above, bonded carded webs, and meltblown webs of various polymers or combinations of polymers and other fibers such as cellulosic fibers. It is important that the substrate material have a softening point sufficiently lower than the temperature of the extruded polymer melt and that the melted substrate material be miscible with the extended polymer melt in order for thermal bonding to occur. Spunbonded polypropylene webs having a basis weight of at least about 5 gsm are preferred because of their uniform formation and relatively high isotropic strength per unit weight. Such a web is available commercially from Lutravil Corporation under the trademark LUTRICIL and has a basis weight of about 10 gsm.

Figure 2:
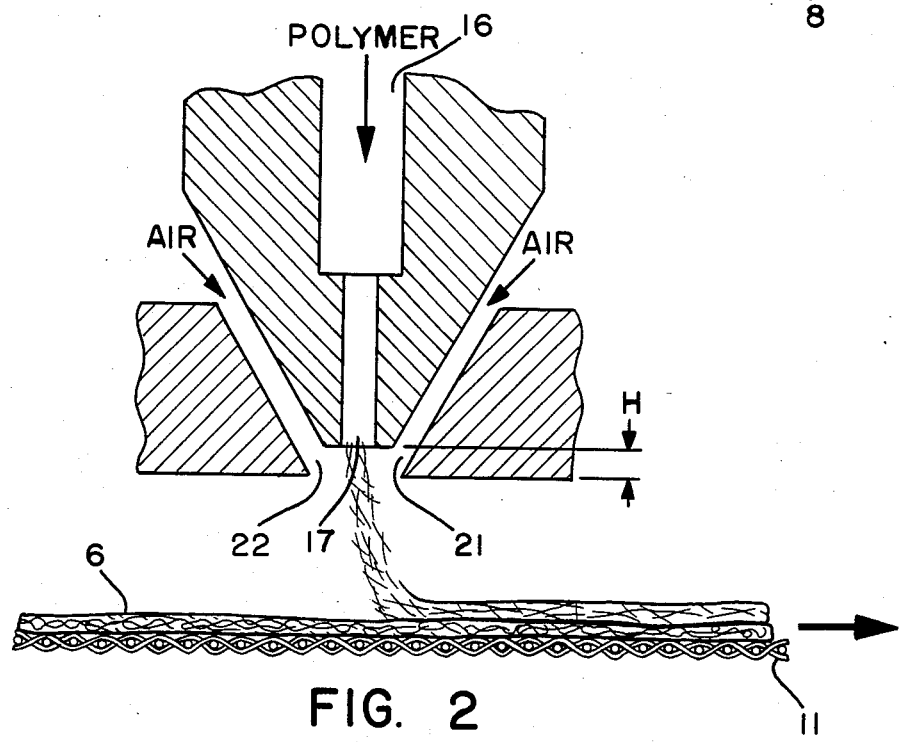
FIG. 2 is a cross-sectional view of the blowing head used for meltblowing in the method of FIG. 1.

FIG. 2 illustrates in cross-section the configuration of the blowing head. Shown is a polymer melt supply passageway 16 which is stepped down in size to about 0.0145 inch at the die tip orifice 17. The die tip orifice 17 is recessed about 0.090 inch. The polymer melt temperature can be from about 540° F. to about 600° F. for polypropylene. Converging hot air slots 21 and 22 have a slot opening of about 0.067 inch and extend the width of the blowing head. The length of the channels 21 and 22 is about 1.75 inches. In operation, hot air is supplied to the hot air channels, creating a downward hot air flow which disrupts the polymer extrudate as it leaves the die tip. The hot air flow serves to draw out the extruded fibers and the flow rate can be used to control the resulting fiber diameter and the abrasiveness of the resulting meltblown layer. The lower hot air flow rates provide thicker fibers and higher flow rates create thinner fibers. The resulting extrudate melt fragments (meltblown fibers) are blown downwardly onto the travelling supporting web before they have sufficient time to solidify. Hence the meltblown fibers are deposited while in a semi-molten state sufficient to permit the fibers to intimately thermally bond to the fibers of the supporting web. To achieve deposition of the meltblown fibers while still in a semi-molten state, it is necessary to properly balance the polymer flow rate, the hot air flow rate, the diameter of the die tip orifice, and the distance between the die tip and the supporting web. To some degree these conditions occasionally occur inadvertently during commercial meltblown fiber operations where the resulting nonwoven material is referred to as "shotty" material and is rejected as waste material. However, consistent formation of such semi-molten material is essential for purposes of this invention.

As an example, it has been found that the abrasive material of this invention can be produced from the abovesaid apparatus and process using a polymer (590° F.) flow rate through the die tip of about 1.1 pounds per inch of die tip width per hour, a hot air (533° F.) flow rate through the die tip of about 75 standard cubic feet per minute (pressure differential of about 3 psi), and a distance between the die tip and the supporting web of about 14 inches. These conditions result in the deposition of semi-molten fibers having an average fiber diameter of about 50.8 micrometers, which is substantially thicker than conventional meltblown fibers, which typically have fiber diameters of about 7 micrometers.

Figure 3:
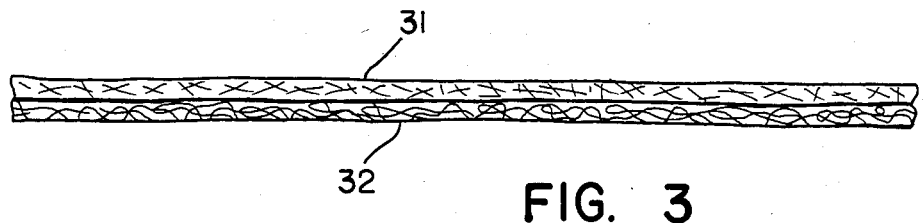
FIG. 3 is a cross-sectional view of a product of this invention, illustrating a single-ply meltblown/spunbonded layered product.

FIG. 3 is a cross-sectional view of a representative abrasive wiping product of this invention. Shown is a meltblown layer 31 thermally bonded to a spunbonded supporting layer 32.

Figure 4:
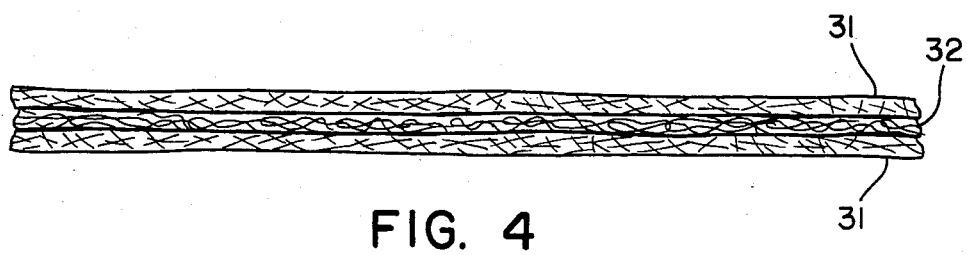
FIG. 4 is a cross-sectional representation of a single-ply meltblown/spunbonded/meltblown product form of this invention.

FIG. 4 is a cross-sectional representation of a modified product of this invention, which has an abrasive meltblown layer of fibers 31 on both outer sides. Such a product can be manufactured using a web as shown in FIG. 3 as the supporting web in the method illustrated in FIG. 1. Such a product can be particularly useful if differing degrees of abrasiveness are desired in a single product.

Figure 5:
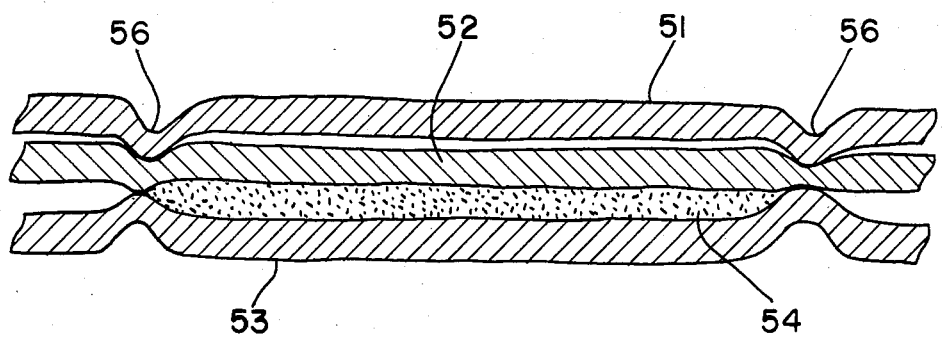
FIG. 5 is a cross-sectional view of a three-ply product form of this invention.

FIG. 5 illustrates yet another embodiment of this invention having three plies and containing a detergent. Shown is a first outer ply 51 which comprises an abrasive meltblown/spunbonded web as illustrated in FIG. 3 and having the meltblown layer facing outwardly, an inner ply of water-permeable nonwoven thermoplastic 52, and a second outer ply 53 comprising a water-permeable meltblown web. In between the inner ply and the second outer ply is entrapped detergent 54. All three plies are suitably bonded about the periphery of the composite web at bonded areas 56 to retain the detergent and the integrity of the composite web.

In all of the product forms of this invention, it can be advantageous to impregnate the product with various additives, such as detergents, surfactants, cleaners, bleaches, perfumes, disinfectants, germicides, virucides, etc.

It will be appreciated that the foregoing examples, shown for purposes of illustration, are not to be construed as limiting the scope of this invention to only those embodiments specifically described. A wide variety of product embodiments can be constructed using the abrasive meltblown web and method of this invention.

We claim:

1. A layered abrasive web comprising a supporting layer and a meltblown abrasive layer thermally bonded together, said meltblown abrasive layer having a basis weight of from about 5 to about 25 grams per square meter and essentially consisting of fibers having an average fiber diameter of at least about 40 micrometers.

2. The web of claim 1 wherein the supporting layer is spunbonded polypropylene.

3. The web of claim 2 wherein the average fiber diameter is from about 40 to about 85 micrometers.

4. The web of claim 2 wherein the average fiber diameter is about 50 micrometers.

5. A method for making an abrasive web comprising meltblowing a polymer melt into bilers through a die tip in a semi-molten state onto a supporting web in other than a semi-molten staten and composed of elements which are dimensionally distinct from the melt-blown fibers state such that upon contact with the supporting web the meltblown fibers thermally bond to the supporting web.

6. A wiping product comprising a first outer ply, an inner ply, and a second outer ply, said first outer ply comprising the layered abrasive web of claim 2, the inner ply comprising a water-permeable nonwoven thermoplastic web, and the second outer ply comprising a water-permeable meltblown thermoplastic web, wherein each of said plies is commonly bonded together around the periphery of the wiping product and wherein a detergent is contained between said inner ply and said second outer ply.

7. The wiping product of claim 6 wherein the second outer ply comprises a polypropylene meltblown web having a basis weight of from about 5 to about 25 grams per square meter and fibers having an average diameter of from about 40 to about 85 micrometers.

8. The wiping of claim 6 wherein the second outer ply is the same as the first outer ply.

9. A wiping product comprising first and second outer plies, wherein each of the outer plies consists of the layered abrasive web of claim 1 having the abrasive layer of the web facing outwardly.

* * * * *